US008718911B2

(12) United States Patent
McGuffin

(10) Patent No.: US 8,718,911 B2
(45) Date of Patent: May 6, 2014

(54) SYSTEMS AND METHODS FOR PRESENTING TAXI INSTRUCTIONS AND REDUCING RUNWAY INCURSIONS

(75) Inventor: Tom McGuffin, Bellevue, WA (US)

(73) Assignee: Honeywell International Inc., Morristown, NJ (US)

( * ) Notice: Subject to any disclaimer, the term of this patent is extended or adjusted under 35 U.S.C. 154(b) by 495 days.

(21) Appl. No.: 13/078,715

(22) Filed: Apr. 1, 2011

(65) Prior Publication Data

US 2012/0253649 A1 Oct. 4, 2012

(51) Int. Cl.

| | |
|---|---|
| ***G06F 17/00*** | (2006.01) |
| ***G06F 19/00*** | (2011.01) |
| ***B64C 13/00*** | (2006.01) |
| ***G01C 21/00*** | (2006.01) |

(52) U.S. Cl.

USPC ........... 701/120; 701/409; 701/414; 701/428; 701/435; 340/901; 340/945; 340/972; 340/995.13; 244/76 R

(58) Field of Classification Search

USPC ......... 701/1, 3, 14, 15, 16, 23, 24, 25, 36, 41, 701/45, 49, 29.1, 29.3, 70, 78, 79, 93, 96, 701/116, 117, 120, 121, 122, 400, 408, 409, 701/410, 411, 412, 414, 418, 419, 420, 421, 701/422, 423, 428, 429, 430, 431, 435, 437, 701/438, 439, 440, 516, 522, 523, 528, 532, 701/300, 301; 340/901, 902, 903, 905, 945, 340/963, 971, 972, 978, 988, 989, 990, 991, 340/993, 995.1, 995.12, 995.13, 995.14, 340/995.15, 995.17, 995.18, 995.19, 995.2, 340/995.24; 244/75.1, 76 R, 175, 194, 195, 244/196

See application file for complete search history.

(56) References Cited

U.S. PATENT DOCUMENTS

| | | | | |
|---|---|---|---|---|
| 5,519,618 | A * | 5/1996 | Kastner et al. | 701/120 |
| 6,731,226 | B2 * | 5/2004 | Walter | 340/972 |
| 6,789,010 | B2 * | 9/2004 | Walter | 701/120 |
| 6,862,519 | B2 * | 3/2005 | Walter | 701/120 |
| 7,109,889 | B2 * | 9/2006 | He | 340/971 |
| 7,194,342 | B1 | 3/2007 | Horvath et al. | |
| 7,382,288 | B1 * | 6/2008 | Wilson et al. | 340/972 |
| 7,564,372 | B1 * | 7/2009 | Bailey et al. | 340/961 |
| 7,567,187 | B2 | 7/2009 | Ramaiah et al. | |
| 7,587,278 | B2 | 9/2009 | Poe et al. | |
| 7,737,867 | B2 | 6/2010 | Arthur et al. | |
| 7,813,845 | B2 | 10/2010 | Doose et al. | |
| 8,180,562 | B2 * | 5/2012 | Clark et al. | 701/446 |
| 8,386,167 | B2 * | 2/2013 | Clark et al. | 701/411 |

(Continued)

OTHER PUBLICATIONS

EPExamination Report, EP 12 153 394.7, dated May 24, 2012.

(Continued)

*Primary Examiner* — Thomas Tarcza
*Assistant Examiner* — Edward Pipala
(74) *Attorney, Agent, or Firm* — Ingrassia Fisher & Lorenz, P.C.

(57) ABSTRACT

A system and method are provided for presenting a taxi route for an aircraft at an airport. The method, for example, includes, but is not limited to receiving, by a processor, the taxi route, translating, by the processor, the taxi route into a graphical representation, displaying, on an aircraft display, a map of the airport and the graphical representation, and displaying, a location of a hold short instruction on the aircraft display.

20 Claims, 6 Drawing Sheets

(56) References Cited

U.S. PATENT DOCUMENTS

| | | | | |
|---|---|---|---|---|
| 8,401,775 | B2 * | 3/2013 | Rozovski et al. | 701/120 |
| 2003/0105579 | A1 * | 6/2003 | Walter | 701/120 |
| 2003/0105581 | A1 | 6/2003 | Walter | |
| 2003/0160708 | A1 * | 8/2003 | Knoop | 340/958 |
| 2004/0124998 | A1 | 7/2004 | Dame | |
| 2009/0018713 | A1 | 1/2009 | Coulmeau et al. | |
| 2009/0089693 | A1 | 4/2009 | Fahy | |
| 2009/0306887 | A1 * | 12/2009 | Clark et al. | 701/202 |
| 2010/0125403 | A1 | 5/2010 | Clark et al. | |
| 2010/0198489 | A1 | 8/2010 | Rozovski et al. | |
| 2011/0029225 | A1 | 2/2011 | Stayton et al. | |
| 2011/0125399 | A1 * | 5/2011 | Clark et al. | 701/208 |
| 2011/0196598 | A1 * | 8/2011 | Feyereisen et al. | 701/120 |

OTHER PUBLICATIONS

EP Search Report, EP 12153394.7-2215 dated Nov. 5, 2012.

* cited by examiner

400

600

SYSTEMS AND METHODS FOR PRESENTING TAXI INSTRUCTIONS AND REDUCING RUNWAY INCURSIONS

STATEMENT REGARDING FEDERALLY SPONSORED RESEARCH OR DEVELOPMENT

This invention was made with Government support under Agreement No. DTFAWA-10-A-80003, Honeywell project number 120599, awarded by the United States Federal Aviation Administration. The Government has certain rights in this invention.

TECHNICAL FIELD

The following relates to aircraft systems and displays, and more particularly relates presenting taxi instructions and reducing runway incursions.

BACKGROUND

Typically an air traffic controller verbally instructs a pilot of an aircraft of a taxi route at an airport. The taxi route may be from a runway to a terminal, from a terminal to a runway or any other possible taxi operation. However, since there are a limited number of frequencies that the air traffic control uses, there is typically more than one aircraft tuned to the frequency. Accordingly, in very rare instances, there is a possibility that a pilot could become confused regarding which taxi route to follow.

SUMMARY

In one embodiment, a method for presenting a taxi route for an aircraft at an airport is provided. The method may include, but is not limited to, receiving, by a processor, a taxi route, translating, by the processor, the taxi route into a graphical representation, displaying, on an aircraft display, a map of the airport and the graphical representation and displaying, a location of a hold short instruction on the aircraft display In another embodiment, a system for presenting a taxi instruction for an aircraft is provided. The system may include, but is not limited to, a data link communications system configured to receive a taxi instruction, a display and a processor coupled to the data link communication system and the display. The processor may be configured to: translate the taxi instruction into a graphical presentation, identify a hold short instruction within the taxi instruction received by the data link communications system, transmit the graphical representation to the display, and transmit a location of the hold short instruction to the display if a hold short instruction is identified within the taxi instruction.

In further embodiments, an aircraft is provided. The aircraft may include, but is not limited to, a display, a controller pilot data link communication ("CPDLC") system configured to receive a CPDLC message including taxi instructions for the aircraft, a processor configured to receive the taxi instructions from the CPDLC system, to translate the taxi instructions into a graphical representation of the taxi instructions and to display the graphical representation of the taxi instructions on the display, and if the taxi instructions include a hold short instruction, the processor is further configured to display a location of the hold short instruction on the display.

DESCRIPTION OF THE DRAWING FIGURES

Exemplary embodiments will hereinafter be described in conjunction with the following drawing figures, wherein like numerals denote like elements.

DETAILED DESCRIPTION OF THE DRAWINGS

According to various exemplary embodiments, aircraft systems and displays are provided for presenting taxi instructions and reducing runway incursions. As discussed in greater detail below, an exemplary system for presenting taxi instructions on an aircraft, may include a data link communications system configured to receive taxi instructions from air traffic control, a display and a processor configured to translate the taxi instructions into a graphical taxi route and to display the graphical taxi route on the display. If the taxi instructions include a hold short instruction, the processor is further configured to display a location of the hold short instruction on the display.

Figure 1:
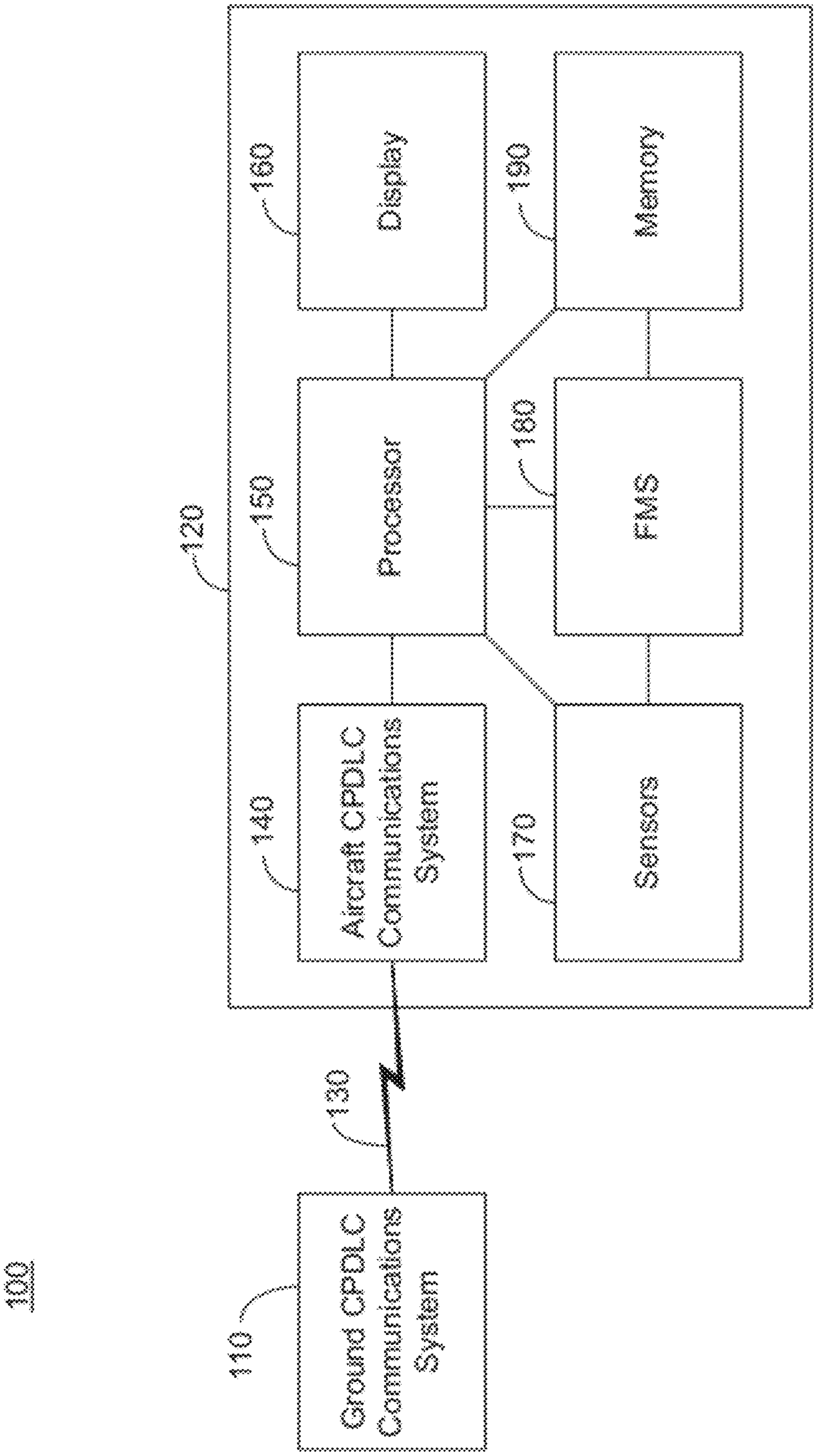
FIG. 1 is a block diagram of an exemplary controller pilot data link communication ("CPDLC") system 100 in accordance with an embodiment.

FIG. 1 is a block diagram of an exemplary controller pilot data link communication ("CPDLC") system 100 in accordance with an embodiment. The CPDLC system 100 includes a ground CPDLC communications system 110 and one or more aircraft 120. The aircraft can be any sort of aircraft, spacecraft or any other type of non-terrestrial vehicle. In other embodiments the CPDLC system 100 may be implemented with terrestrial vehicles, such as those which may be found in an airport setting.

The ground CPDLC communications system no allows air traffic controllers to communicate with a pilot of an aircraft 120 over a data link 130. The ground CPDLC communications system no is capable of issuing many different types of messages. For example, the ground CPDLC communications system no may issue level assignments, crossing constraints, lateral deviations, route changes and clearances, speed assignments, radio frequency assignments, and various requests for information. The messages may be broadcast to every aircraft within a given range, a subset of the aircraft or to a specific aircraft.

For example, an air traffic controller can issue taxi instructions to a specific aircraft through the ground CPDLC communications system 110. Since the taxi instructions are directed to the specific aircraft 120, there is less of a chance that a pilot of a different aircraft could confuse the instructions for their own.

The aircraft 120 includes an aircraft CPDLC communications system 140. The aircraft CPDLC communications system 140 receives messages from the ground CPDLC communications system no via the data link 130 and allows the pilot to, for example, respond to messages, to request clearances and information, to report information, and to declare/rescind an emergency. For example, the pilot, after receiving taxi instructions from an air traffic controller, can respond with a WILCO (will comply) message or an unable message, indicating that the pilot will follow the taxi instructions or is unable to follow the taxi instructions, respectively, as discussed in further detail below.

The aircraft further includes a processor 150 coupled to the aircraft CPDLC communications system 140. The processor 150 may be a central processing unit (CPU), a graphical processing unit (GPU), an application specific integrated circuit, a micro-processor, a field programmable gate array or any other logic device. The processor 150 can process the messages received by the CPDLC communications system 140 as well as the messages to be sent by the CPDLC communications system 140, as discussed in further detail below.

The aircraft may further include a flight management system 180. The flight management system (FMS) 180 may be connected to a sensor 170, or a plurality of sensors, to determine the aircraft's position, and to guide the aircraft 120 along a flight plan. In one embodiment, for example, the processor 150 may be part of the FMS 180. The sensor 170 may be, for example, a global positioning system, an inertial positioning system or the like.

The aircraft 120 further includes a display 160. The display 160 may be a multifunction control display unit (MCDU), a multifunction display unit (MFD), a heads up display (HUD) or any other type of display. For example, the display may be a cathode ray tube (CRT) display, a liquid crystal (LCD) display, a plasma display, an organic light-emitting diode (OLED) display, or any other type of display. As discussed in further detail below, the aircraft CPDLC communications system 140 may receive a message that includes taxi instructions. The processor 150 may process the taxi instructions and display a graphical representation of the taxi instructions on a map of an airport. The map data for an airport may be stored, for example, in the memory 190. In another embodiment, the aircraft CPDLC communications system 140 may receive map data for an airport via the data link 130. In other embodiments, the aircraft 120 may receive the map data via another communications system (not illustrated).

Figure 2:
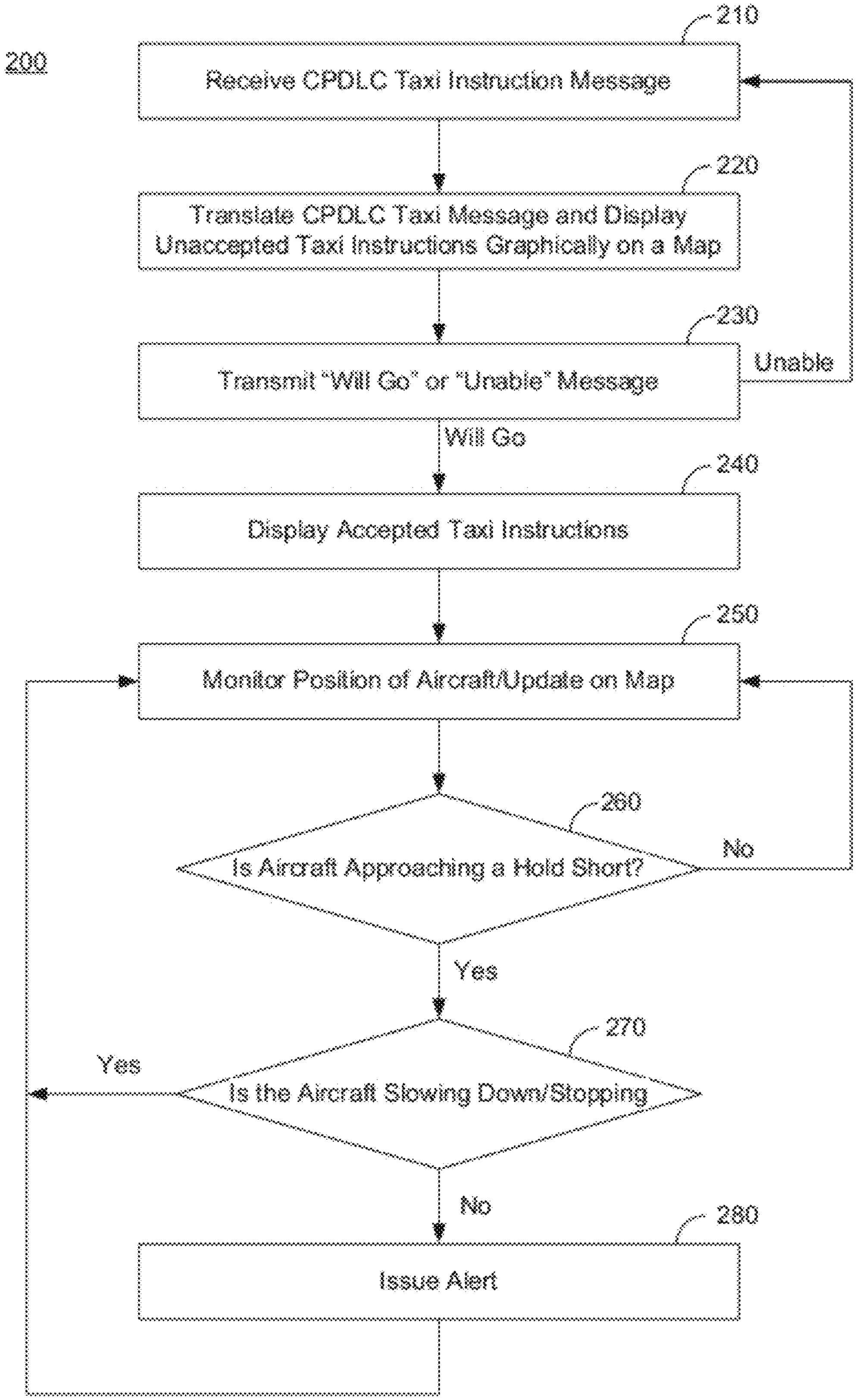
FIG. 2 is a flow diagram of an exemplary method of using the CPDLC system illustrated in FIG. 1, in accordance with an embodiment.

FIG. 2 is a flow diagram of an exemplary method 200 using a CPDLC system 100, in accordance with an embodiment. The method includes receiving a CPDLC message including taxi instructions for an aircraft 120. (Step 210). The taxi instruction may include, for example, a route for the aircraft 120 to follow while taxing to or from a runway. The taxi instructions may include, for example, instructions for which taxiway to traverse, instructions for which runway to use, instructions to make a turn or a plurality of turns (right, left, u-turn, etc), instructions to hold short at a designated location, or any combination thereof. In one embodiment, for example, the taxi instructions may be displayed on display 160 in textual form. The following is an example of a CPDLC taxiway instruction:

TAXI TO HOLDING POINT E FOR RUNWAY 27L
VIA TAXIWAY B
HOLD SHORT OF RWY 31/13
NEXT EXPECT TWY F E

After the aircraft CPDLC communications system 140 receives the CPDLC message, the processor 150 translates taxi instructions into graphical taxi instructions and then displays the graphical taxi instructions on a map. (Step 220). For example, the processor 150 may parse the CPDLC message to identify which part of the CPDLC message contains the taxi instructions. The processor can then extract the relevant taxi instructions from the CPDLC message. In one embodiment, for example, the processor 150 may store the extracted taxi instructions in the memory 190. The processor can then correlate the taxi instructions with airport map data. As discussed above, airport map data may be stored in the memory 190. In other embodiments, airport map data may be transmitted to the aircraft 120 over the data link 130 or some other communications system. The processor 150 can then display the map data and the corresponding graphical taxi instructions on the display 160.

Figure 3:
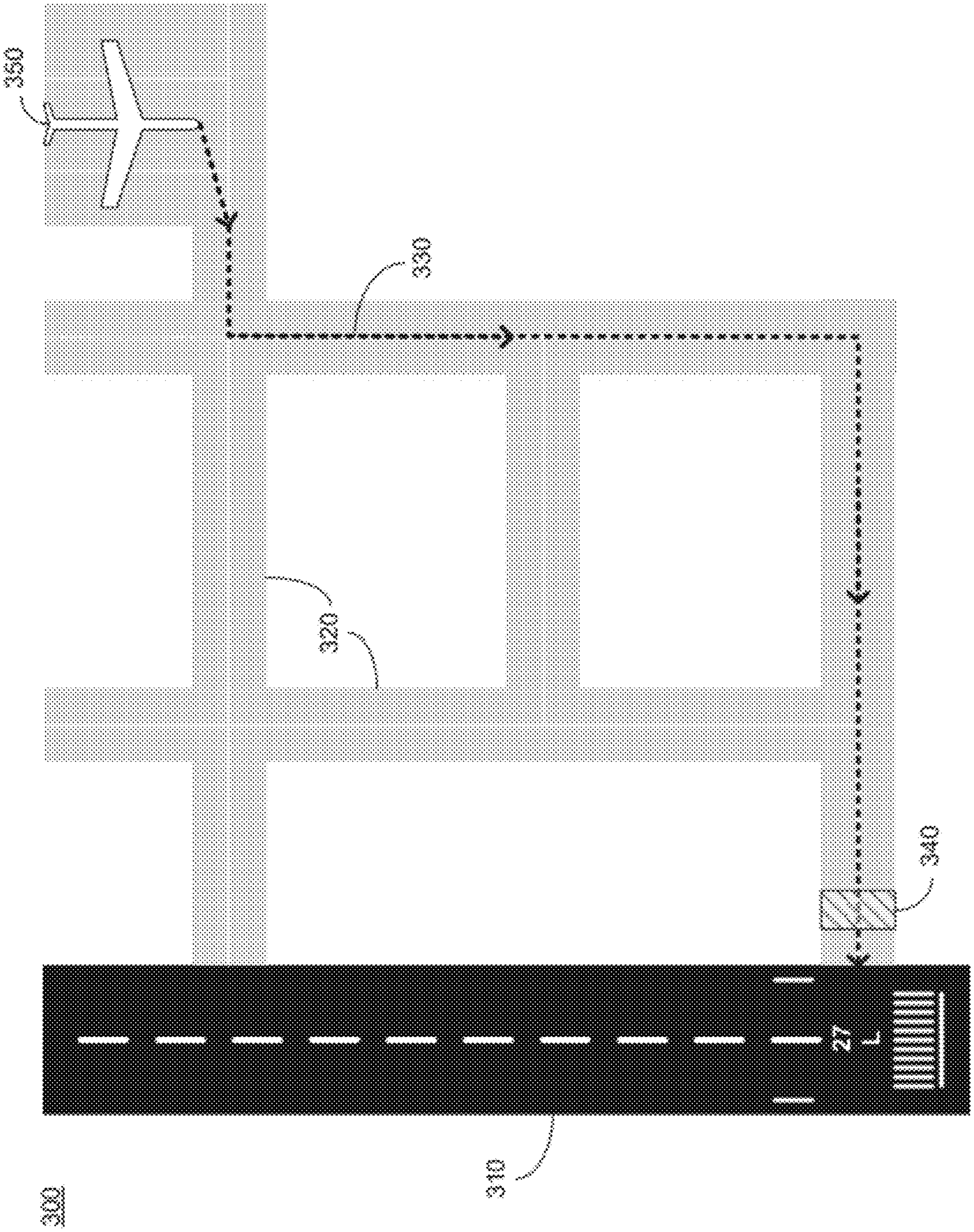
FIG. 3 illustrates an exemplary graphic map of an airport generated the system illustrated in FIG. 1, in accordance with an embodiment.

FIG. 3 illustrates an exemplary graphic map 300 of an airport generated by processor 150 and displayed on display 160 in accordance with an embodiment. The map 300 includes a runway 310 and a plurality of taxiways 320. While not illustrated in FIG. 3, the map could also display hangers, terminals and any other building at an airport. As discussed above, the map 300 may be generated based upon data stored in the memory 190. In other embodiments, map data may be transmitted to the aircraft 120 over the data link 130 from an air traffic controller.

The position of the aircraft 120 may be indicated on the map 300 by a symbol 350. In the embodiment illustrated in FIG. 3, the symbol 350 is a picture of an aircraft, but any other symbol may be used to indicate the aircrafts position. As discussed above, the sensors 170 may track the aircrafts position and may transmit the aircrafts position to the FMS 180 or the processor 150.

As seen in FIG. 3, segments of graphical taxi instructions 330 are displayed on the display 160. Prior to the pilot accepting or rejecting the taxi instructions, the graphical taxi instructions 330 may be indicated by, for example, a dashed line as illustrated in FIG. 3. The graphical taxi instructions 330 may also include a hold short instruction 340 at a designated location. In other embodiments, the unaccepted taxi instructions 330 may be indicated by a solid line, a dotted line or any other line pattern. The unaccepted taxi instructions 330 may also have a predetermined color associated therewith. Any combination of line color and line pattern may be used to indicate the unaccepted taxi instructions 330.

Returning to FIG. 2, after a crew member has reviewed the graphical taxi instructions 330, the crew member can issue a WILCO message, indicating that the pilot intends to follow the taxi instructions, or an unable message, indicating that the pilot can not follow the taxi instructions. (Step 230). As discussed above, the WILCO message and unable message can be transmitted by the aircraft CPDLC communications system 140 to the ground CPDLC communications system 110 using the data link 130 to inform air traffic control of the pilot's decision. If the pilot sends the "unable" message, the process returns to step 210 to await new taxi instructions.

Figure 4:
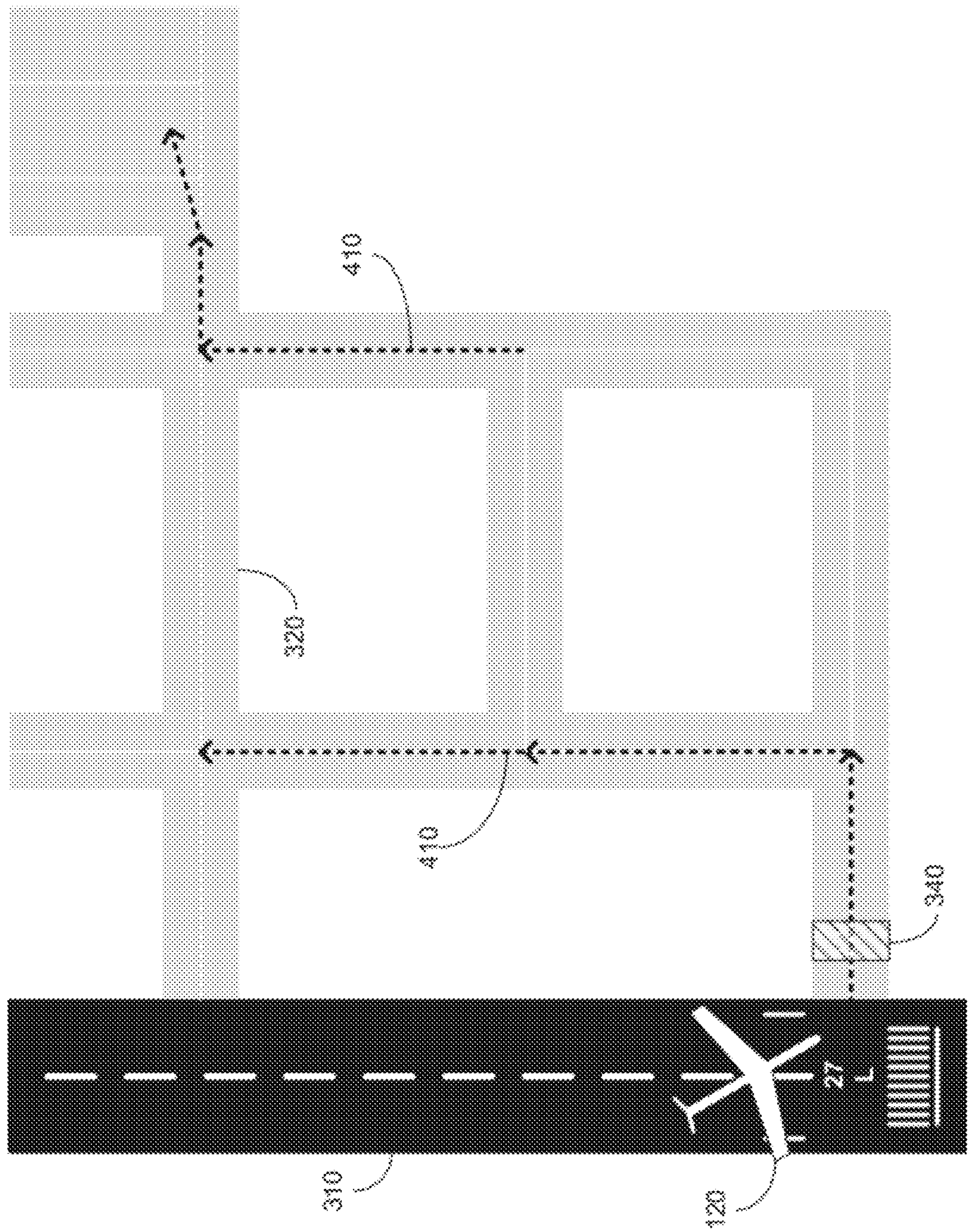
FIG. 4 illustrates another exemplary graphic map of an airport generated the system illustrated in FIG. 1, in accordance with an embodiment.

FIG. 4 illustrates another exemplary graphical map of an airport 400 and unaccepted taxi instructions 410 generated by processor 150 and displayed on display 160 in accordance with an embodiment. In exceptionally rare instances, the taxi route suggested by the air traffic controller may contain errors or inconsistencies. The taxi route suggested for the aircraft 120 in FIG. 4, for example, is unclear and/or incomplete since there isn't a clear and complete pathway from the aircraft's location to the aircraft's destination. By displaying the graphical taxi instructions 410 on the display 160, the pilot, or other crew member, can easily perceive the route suggested by air traffic control. Accordingly, if there are any issues with the suggested taxi route, such as conflicting instructions and/or missing segments illustrated in FIG. 4, the pilot will easily be able to identify the errors, issue the "unable" response and request new taxi instructions from air traffic control. The pilot enters the response on the display which displayed the text message such as a MCDU or a MFD.

Figure 5:
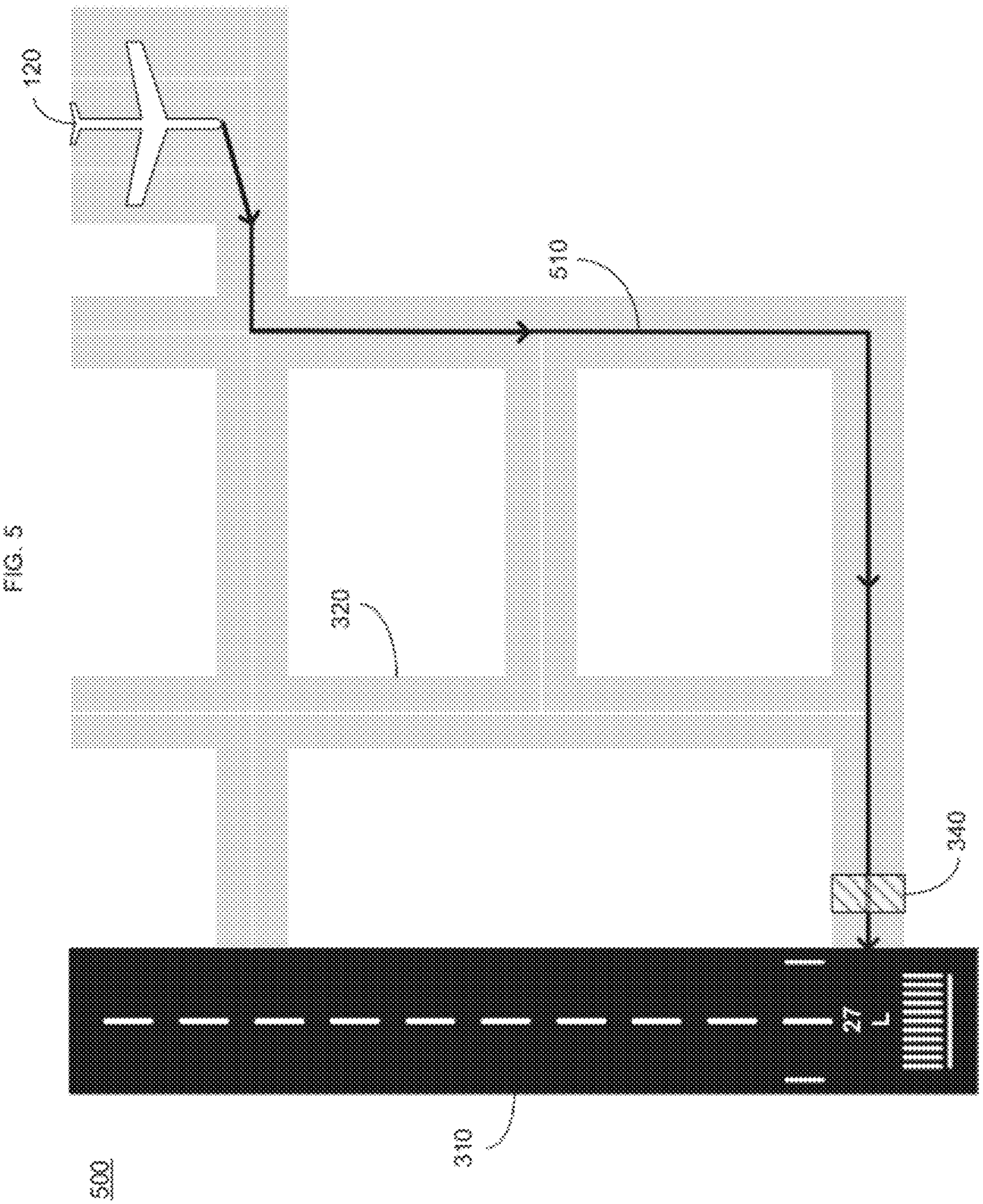
FIG. 5 illustrates yet another exemplary graphic map of an airport generated the system illustrated in FIG. 1, in accordance with an embodiment.

Returning to FIG. 2, when the crew member issues the WILCO response, the processor 150 displays the accepted taxi instructions on the display 160. (Step 240). FIG. 5 illustrates an exemplary graphical map of an airport 500 and accepted taxi instructions 510 generated by processor 150 and displayed on display 160 in accordance with an embodiment. As discussed above, unaccepted taxi instructions may be displayed with any combination of a color and line pattern. After the pilot has issued the WILCO message, the color and/or pattern of the line may change to indicate that the taxi instructions have been accepted by the pilot. As with the unaccepted taxi instructions, the accepted taxi instructions 510 may be displayed with any combination of color and line pattern. The process can also track the position and speed of the aircraft relative to hold short instructions and is capable of issuing warnings, as discussed in further detail below.

Returning to FIG. 2, as the aircraft traverses the taxiway, the FMS 180 monitors the position of the aircraft 120 and updates the position of the aircraft 120 on the display accordingly. (Step 250). As the aircraft 120 is traversing the taxi route, the pilot can monitor the display to determine which taxiway to follow and when to make turns, allowing the pilot to pay more attention to what is going on around the aircraft 120. As discussed above, the aircraft include a sensor 170 which may output a position of the aircraft 120. The processor 150, in conjunction with the FMS 180, then determines if a position of the aircraft 120 is approaching a hold short area 340. (Step 260).

If the aircraft is not approaching a hold short area 340, the process returns to Step 250 where the FMS 180 continues to monitor the position of the aircraft. If the aircraft 120 is approaching a hold short area 340, the processor 150 (or FMS 180) monitors the speed of the aircraft 120 in relation to a position of the aircraft 120. (Step 270). If the aircraft's speed is consistent with stopping at the designated location, than the process returns to Step 250 and the FMS 180 continues to monitor the position of the aircraft. However, if the aircraft's speed is not consistent with stopping at the designated location, than the FMS 180 issues a warning. (Step 280).

The FMS 180 may determine, for example, if the aircraft's speed is above a first or second predetermined threshold. The first and second predetermined thresholds may be stored, for example, in memory 190. The first predetermined threshold may indicate, for example, that the aircraft's speed is inconsistent with stopping at the designated location. The second predetermined threshold may indicate, for example, a higher threshold corresponding to a heightened situation. The first and second predetermined thresholds can vary depending upon the distance of the aircraft from the designated stopping location. For example, the first and second predetermined thresholds may be reduced as the aircraft approaches the designated stopping points. Further, the first and second predetermined thresholds may vary depending upon the aircraft and the configuration of the aircraft. For example, a heavier aircraft, may take longer to stop than a lighter aircraft, and thus, would have correspondingly lower speed threshold points. Furthermore, a load of the aircraft, depending upon the cargo, the number of passengers, the amount of fuel stored thereon and a configuration of the aircraft may alter the stopping distance of the aircraft 120. Accordingly, the processor 150 may alter the first and second predetermined thresholds to take into account the configuration of the aircraft.

The warning may depend upon the speed of the aircraft and/or the remaining distance between the aircraft and the designated stopping point. For example, if the aircraft's speed is above the first predetermined threshold but below the second predetermined threshold, a mild warning may be issued. The mild warning may be, for example, a flashing stop symbol on the aircraft's display 160 and/or an audible alert. If the aircraft's speed is above the second predetermined threshold, the FMS 180 may issue both an audible alert and a visual alert. For example, the audible alert may be a voice saying "STOP," a screeching brake sound or any other audible warning.

Figure 6:
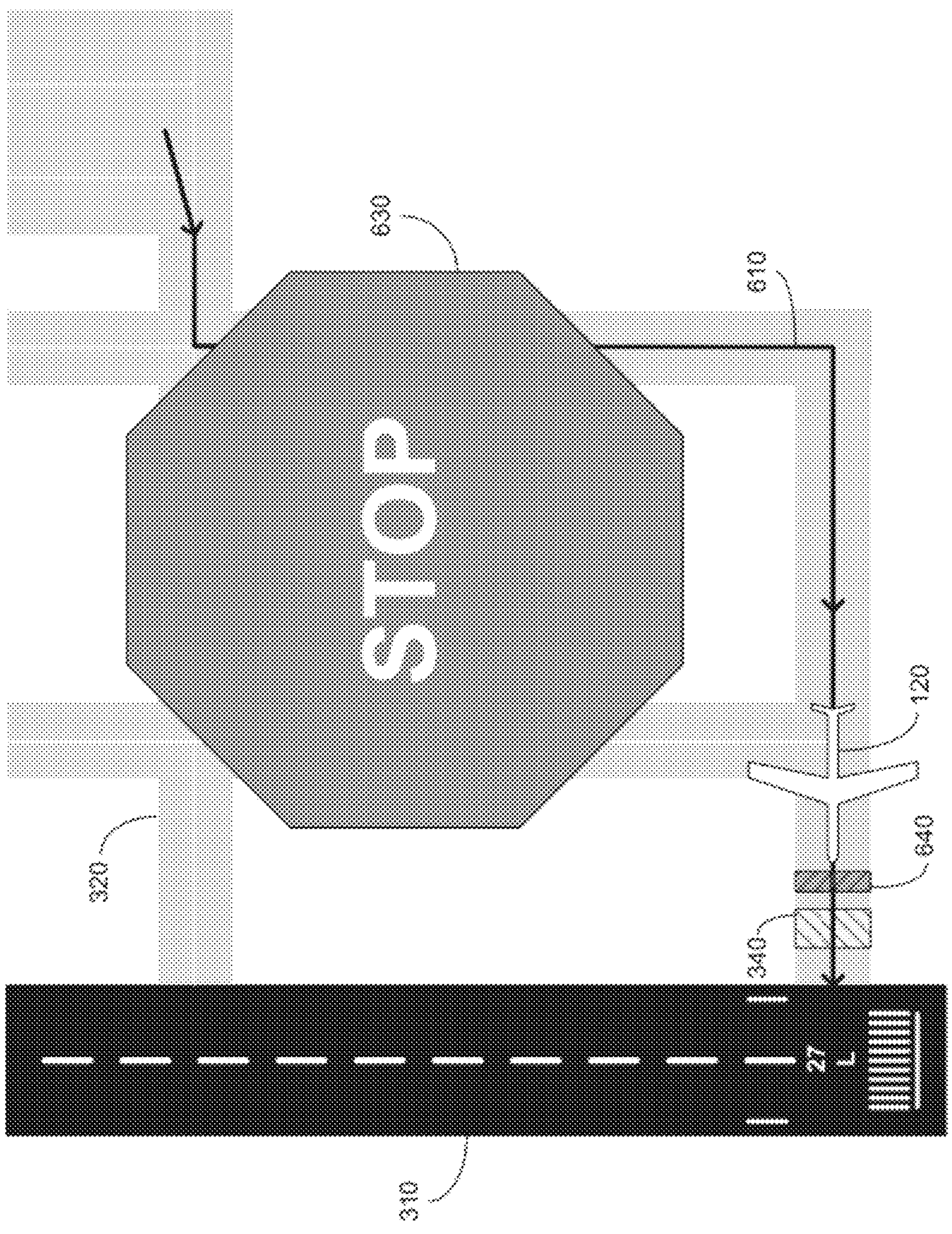
FIG. 6 illustrates yet another exemplary graphic map of an airport generated the system illustrated in FIG. 1, in accordance with an embodiment.

FIG. 6 illustrates another exemplary graphical map of an airport 600 and accepted taxi instructions 610 generated by processor 150 and displayed on display 160 in accordance with an embodiment. As seen in FIG. 6, the aircraft 120 is approaching a location of a designated hold short instruction 620. As discussed above, if the aircraft is traveling at a speed greater than a first predetermined threshold, indicating that the aircraft movement is inconsistent with stopping at the designated location, a visual warning 630 may be issued. The visual warning 630 may blink, shift in position, change color or modify in any other way to get the pilots attention. In another embodiment a visual warning 640 may be used to get the attention of the pilot. The visual warning 640 may appear, for example, if the aircraft's speed is above either the first or second predetermined threshold. In one embodiment, for example, the visual warning 640 may appear in a first color when the aircraft's speed is above the first predetermined threshold and a second color if the aircraft's speed is above the second predetermined threshold.

Generally speaking, the various functions and features of method 200 may be carried out with any sort of hardware, software and/or firmware logic that is stored and/or executed on any platform. Some or all of method 200 may be carried out, for example, by the FMS 180 and/or the processor 150 in FIG. 1. For example, various functions shown in FIG. 2 may be implemented using software or firmware logic. The particular hardware, software and/or firmware logic that implements any of the various functions shown in FIG. 2, however, may vary from context to context, implementation to implementation, and embodiment to embodiment in accordance with the various features, structures and environments set forth herein. The particular means used to implement each of the various functions shown in FIG. 2, then, could be any sort of processing structures that are capable of executing software and/or firmware logic in any format, and/or any sort of application-specific or general purpose hardware, including any sort of discrete and/or integrated circuitry.

The term "exemplary" is used herein to represent one example, instance or illustration that may have any number of alternates. Any implementation described herein as "exemplary" should not necessarily be construed as preferred or advantageous over other implementations.

Although several exemplary embodiments have been presented in the foregoing description, it should be appreciated that a vast number of alternate but equivalent variations exist, and the examples presented herein are not intended to limit the scope, applicability, or configuration of any of the embodiments in any way. To the contrary, various changes may be made in the function and arrangement of the various features described herein without departing from the scope of the claims and their legal equivalents.

What is claimed is:

1. A method for presenting a taxi route for an aircraft of an airport, comprising:

receiving, by a processor, the taxi route via text based instructions;

translating, by the processor, the text based instructions into a graphical representation of the taxi route;

displaying, on an aircraft display, a map of the airport and the graphical representation of the taxi route; and displaying, a location of a hold short instruction on the aircraft display.

2. The method according to claim 1, further comprising transmitting the taxi route to the processor with a controller pilot data link communication.

3. The method according to claim 2, wherein the translating the taxi route in the graphical representation further comprises:

parsing a communication of the controller pilot data link communication;

extracting the taxiway route; and correlating the taxiway route with map data of the airport.

4. The method according to claim 1, further comprising issuing a first alert if a speed of the aircraft is greater than a first threshold as the aircraft is approaching the location of the hold short instruction.

5. The method according to claim 4, further comprising issuing a second alert if a speed of the aircraft is greater than a second threshold as the aircraft is approaching the location of the hold short instruction.

6. The method of claim 5, wherein the first threshold and second threshold vary based upon a distance of the aircraft relative to the location of the hold short instruction.

7. The method of claim 5, wherein the second alert is audible and visual.

8. A system for presenting a taxi instruction for an aircraft, comprising:

a data link communications system configured to receive a-text based taxi instruction;

a display; and a processor coupled to the data link communication system and the display, the processor configured to:

translate the text based taxi instruction into a graphical representation of the taxi instruction;

identify a hold short instruction within the text based taxi instruction received by the data link communications system;

transmit the graphical representation of the taxi instruction to the display; and transmit a location of the hold short instruction to the display if a hold short instruction is identified within the text based taxi instruction.

9. The system of claim 8, wherein the data link communications system is a controller pilot data link communication system.

10. The system of claim 8, wherein the processor when translating the taxi instructions is further configured to:

parse the text based taxi instructions;

extract relevant taxiway instructions; and correlate the extracted relevant taxiway instructions with map data of the airport.

11. The system of claim 8, further comprising a flight management system configured to monitor a position of the aircraft and a speed of the aircraft.

12. The system of claim 11, wherein the processor is further configured to receive the location and speed of the aircraft from the flight management system and to issue a first alert if the speed of the aircraft is greater than a first threshold as the aircraft is approaching the location of the hold short instruction.

13. The system of claim 12, wherein the processor is further configured to issue a second alert if the speed of the aircraft is greater than a second threshold as the aircraft is approaching the location of the hold short instruction.

14. The system of claim 13, wherein the first threshold and second threshold vary based upon a distance of the aircraft relative to the location of the hold short instruction.

15. The system of claim 14, wherein the second alert is audible and visual.

16. An aircraft, comprising:

a display;

a controller pilot data link communication (CPDLC) system configured to receive a CPDLC message including text based taxi instructions for the aircraft;

a processor configured to receive the text based taxi instructions from the CPDLC system, to translate the text based taxi instructions into a graphical representation of the taxi instructions and to display the graphical representation of the taxi instructions on the display, wherein, if the text based taxi instructions include a hold short instruction, the processor is further configured to display a location of the hold short instruction on the display.

17. The aircraft of claim 16, further comprising:

a memory configured to store map data for an airport, wherein the processor, when translating the text based taxi instructions, is further configured to:

parse the text based taxi instructions;

extract relevant taxiway instructions; and correlate the extracted relevant taxiway instructions with the map data of the airport.

18. The aircraft of claim 16, further comprising:

a flight management system configured to monitor a position of the aircraft and a speed of the aircraft, wherein the processor is further configured to receive the location and speed of the aircraft from the flight management system and to issue a first alert if the speed of the aircraft is greater than a first threshold as the aircraft is approaching the location of the hold short instruction.

19. The aircraft of claim 18, wherein the processor is further configured to issue a second alert if the speed of the aircraft is greater than a second threshold as the aircraft is approaching the location of the hold short instruction.

20. The aircraft of claim 19, wherein the first threshold and second threshold vary based upon a distance of the aircraft relative to the location of the hold short instruction.

* * * * *